(12) United States Patent
Kofman (10) Patent No.: US 10,685,302 B2
(45) Date of Patent: Jun. 16, 2020

(54) COLLABORATIVE TASK MANAGEMENT AND COMPLETION

(71) Applicant: Dropbox, Inc., San Francisco, CA (US)

(72) Inventor: Igor Kofman, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 1060 days.

(21) Appl. No.: 14/449,038

(22) Filed: Jul. 31, 2014

(65) Prior Publication Data

US 2016/0034844 A1    Feb. 4, 2016

(51) Int. Cl.
| | |
|---|---|
| *G06Q 10/06* | (2012.01) |
| *G06Q 10/10* | (2012.01) |
| *G06F 16/951* | (2019.01) |
| *G06F 3/0482* | (2013.01) |

(52) U.S. Cl.
CPC ... *G06Q 10/063114* (2013.01); *G06F 16/951* (2019.01); *G06Q 10/103* (2013.01); *G06F 3/0482* (2013.01); *G06Q 10/0633* (2013.01); *G06Q 10/06311* (2013.01)

(58) Field of Classification Search
CPC ......... G06Q 10/063114; G06Q 10/103; G06Q 10/06311; G06Q 10/0633; G06F 16/951; G06F 3/0482
USPC ........................................................ 705/7.15
See application file for complete search history.

(56) References Cited

U.S. PATENT DOCUMENTS

| | | | | |
|---|---|---|---|---|
| 2003/0160815 | A1* | 8/2003 | Muschetto | G06F 3/0481 715/733 |
| 2005/0246216 | A1* | 11/2005 | Rosen, III | G06Q 10/06 705/28 |
| 2006/0010024 | A1* | 1/2006 | Eguchi | G06Q 10/06 705/7.15 |
| 2006/0074726 | A1* | 4/2006 | Forbes | G06Q 10/0637 705/7.36 |
| 2007/0073575 | A1* | 3/2007 | Yomogida | G06Q 10/063114 705/7.15 |
| 2007/0143169 | A1* | 6/2007 | Grant | G06Q 10/06393 705/7.14 |
| 2007/0282595 | A1* | 12/2007 | Tunning | G06F 40/284 704/9 |
| 2010/0235216 | A1* | 9/2010 | Hehmeyer | G06Q 10/06316 705/7.26 |
| 2010/0287023 | A1* | 11/2010 | Knobel | G06Q 10/06 705/7.13 |

(Continued)

OTHER PUBLICATIONS

Borck, James R. SCM Tools Close the Gap. InfoWorld; San Mateo. 26.10 (Mar. 8, 2004): 28-30.*

(Continued)

*Primary Examiner* — Timothy Padot
(74) *Attorney, Agent, or Firm* — Fenwick & West LLP (57) ABSTRACT

An interface for editing content items permits users to enter tasks and designate metadata relating to the tasks, such as an assigned user for the task, a deadline for the task, and a category of the task. A content item browser presents content items to a user along with a summary of the task completion of tasks within the content item. The summary of task completion may be limited to tasks matching a search query. This permits a user to identify content items and tasks related to the search query from the content item browser, without entering an interface for modifying the content item.

23 Claims, 7 Drawing Sheets

(56) References Cited

U.S. PATENT DOCUMENTS

2011/0313803 A1* 12/2011 Friend .............. G06Q 10/06311
                                                    705/7.13
2013/0091453 A1*  4/2013 Kotler ................ G06Q 30/0209
                                                    715/772

OTHER PUBLICATIONS

Mitchell, Todd et al. User interface for automated project management. Abstract. ProQuest. Sep. 13, 2005.*

* cited by examiner

COLLABORATIVE TASK MANAGEMENT AND COMPLETION

BACKGROUND

This disclosure relates generally to task management, and more particularly to task management for tasks stored within content items.

Users often keep a task list for things that a user needs to do or complete. Examples include tasks to complete in a workday, tasks related to completing a project, tasks relating to a performing to complete a project, tasks to complete in a workday, and items to pack for a trip. Organizing and managing these tasks is a frequent challenge for users. Task organization using a computerized system is typically performed using dedicated task lists, which usually permit a user to enter tasks and indicate when a task is completed. However, these task management systems are typically not integrated into other productivity tools and are not easily searchable or permit assignment to other users. In addition, users cannot easily organize or manage these tasks.

SUMMARY

A content management system provides an interface for a user to edit content items and designate tasks within the content item. The content item is stored by a content management system, and can be accessed and edited by a user operating a client device. Tasks may be designated by a user within the document, for example by using a special character combination, such as "[ ]" that is recognized by the content management system to generate a task. In addition to designating the task, additional characters may also be used to designate metadata about the task. Such metadata may include, for example, assigning the task to a user, categorizing the task, or designating a deadline for task completion. This metadata may be designated by further character combinations, such as @ to assign another user to a task. The tasks and related metadata about the tasks are stored at the content management system and may be separately indexed and searchable.

Content items stored at the content management system are associated with a set of users authorized to edit and revise the content items and may be further organized using collections, file directory structures, categories, and other organizational means. The content management system also provides a browser to view content items, according to content items viewable or editable by a user. When the browser displays a set of content items, the completion status of the tasks within a content item are summarized and a completion status summary is provided to the user for display in the browser. The summary indicates, for example, the total number of tasks associated with the content item and the number of tasks that have been completed. A user may use the browser interface to search for tasks meeting particular metadata, such as tasks assigned to that user or tasks associated with a particular category. The search results associated with the tasks may be presented with a completion status summary associated with the search query. For example, a content item may have many tasks associated with that content item, but only two related to a particular category, one of which is completed. When a user enters a search for that particular category, the content management system identifies tasks in a set of search results relating to the category, determines the content item containing those tasks, and provides an indication that the identified tasks relate to the searched category. In the indication identifying the tasks, the indication includes a summary of the task status, in this example that one of the two tasks has been completed. Multiple content items may be identified as including relevant tasks, and each content item may have its individual relevant tasks summarized. Users may search for tasks based on other metadata, such as an assigned user, the user creating the task, or the deadline for the task. Though these tasks are integrated into the content item, the tasks are easily searchable and completion of tasks can be readily determined by a user from the browser interface.

Though primarily described as relating to a content management system, the task entry and task summaries may be provided by a device managing content items, rather than a centralized content management system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
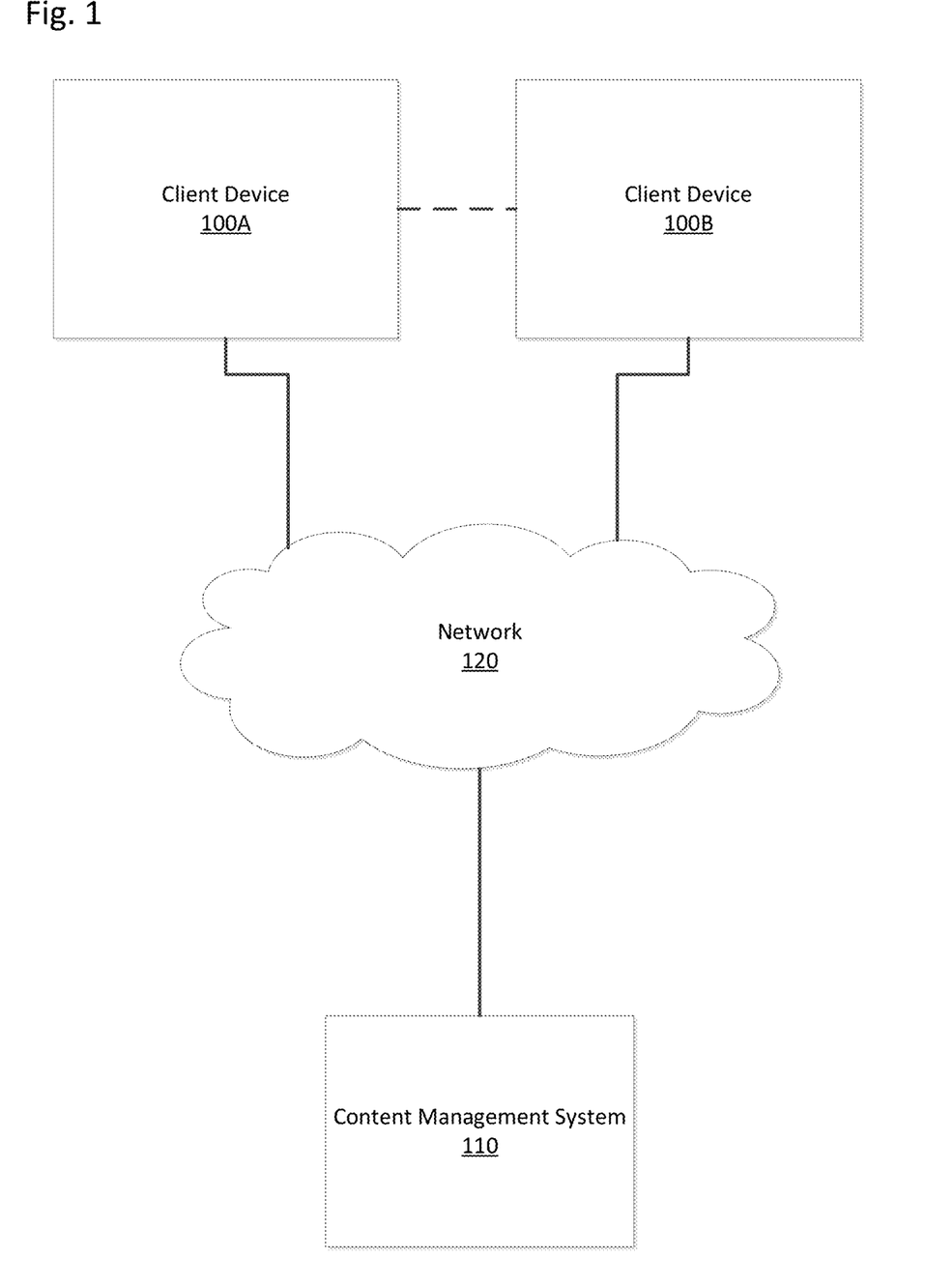
FIG. 1 shows an embodiment of an environment for task management with a content management system.

FIG. 1 shows an embodiment of an environment for task management with a content management system. FIG. 1 includes devices 100A, 100B, 100C (referred to generally as device 100), content management system 110, and network 120. Two devices are shown only for purpose of illustration; in practice any number of devices may be present in the environment. Similarly, other modules or components described and illustrated throughout may include single or multiple instances as appropriate to the needs of the implementer and without loss of generality.

Device 100 may be any suitable computing device for locally storing and viewing content items and synchronizing the content items with content management system 110. Examples of devices include desktop and laptop computers, hand-held mobile devices, tablet computers, and other computing devices. The operation of device 100 in various embodiments is further described below.

Each device 100 communicates with content management system 110 through network 120. Network 120 is any suitable network and may include local networks, corporate networks, global networks, and any combination of these. In typical configurations, devices 100 communicate via a wired or wireless communication network to a local network service provider, and communicate with content management system 110 through the Internet. In certain configurations, devices 100A and 100B communicate directly with one another without network 120 as indicated in FIG. 1 by dashed lines. For example, devices 100 may communicate via a wired or wireless connection, such as wirelessly via a Bluetooth connection or a wired connection via a Universal Serial Bus (USB).

Content management system 110 provides content editing, sharing, and synchronization services for users of devices 100. These services allow users to share content with users of other devices 100. In addition to content sharing, content management system 110 updates shared content responsive to changes and enables synchronized changes to content items across multiple devices 100. A user may synchronize content across multiple devices 100 owned by the user and associated with the user's account, and the user may share content that is synchronized with devices associated with other users' accounts. Content stored by content management system 110 can include any type of data, such as digital data, documents, media (e.g., images, photos, videos, audio, streaming content), data files and databases, source and object code, recordings, and any other type of data or file, collectively referred to here as "content items." Content items stored by content management system 110 may also be used to organize other content items, such as folders, tables, collections, albums, playlists, or in other database structures (e.g., object oriented, key/value etc.). In practice, various devices 100 may be synchronizing different groups of content items, based on user associations, permissions, content sharing permissions, and so forth. The operation of content management system 110 in various embodiments is further described below.

Device 100 includes various modules and components in accordance with one embodiment. Device 100 includes a display for providing information to the user, and certain client devices include a touchscreen. Device 100 also includes a network interface for communicating with content management system 110 via network 120. Other conventional components of a client device include, for example one or more computer processors, local fixed memory (RAM and ROM), as well as optionally removable memory (e.g., SD-card), power sources, and audio-video outputs.

Software modules operating on devices 100 include an operating system and one or more native applications. Native applications vary based on the client device, and may include various applications for creating, viewing, consuming, and modifying content stored on content management system 110, such as word processors, spreadsheets, database management systems, code editors, image and video editors, e-book readers, audio and video players, and the like.

Client device 100 accesses content management system 110 in a variety of ways. Client application 200 can be a dedicated application or module that provides access to the services of content management system 110, providing both user access to shared files through a user interface, as well as programmatic access for other applications. Client device 100 may also access content management system 110 through a web browser. As an alternative, a client application on the client 100 may integrate access to content management system 110 with the local file management system provided by the operating system. When access to content management system 110 is integrated in the local file management system, a file organization scheme maintained at content management system 110 is represented as a local file structure by the operating system in conjunction with a client application. The client application may take various forms, such as a stand-alone application, an application plug-in, or a web browser extension.

Client device 100 provides an interface for a user to add tasks to content items and view tasks in a content item browser. The interface may be provided by client device 100, or client device 100 may communicate with content management system 110 to edit content items and browse content items, for example by interacting with content management system 110 using a web browser. The tasks are entered by a user in a content item. The content items are shown in a content item browser which summarizes tasks according to tasks within content items, and may show groupings of content items according to metadata associated with the tasks, such as the creator of a task, a user assigned to a task, or categories of the task, among others. In other embodiments, the task entry and organization for presentation to the user is performed by client devices 100.

Figure 2:
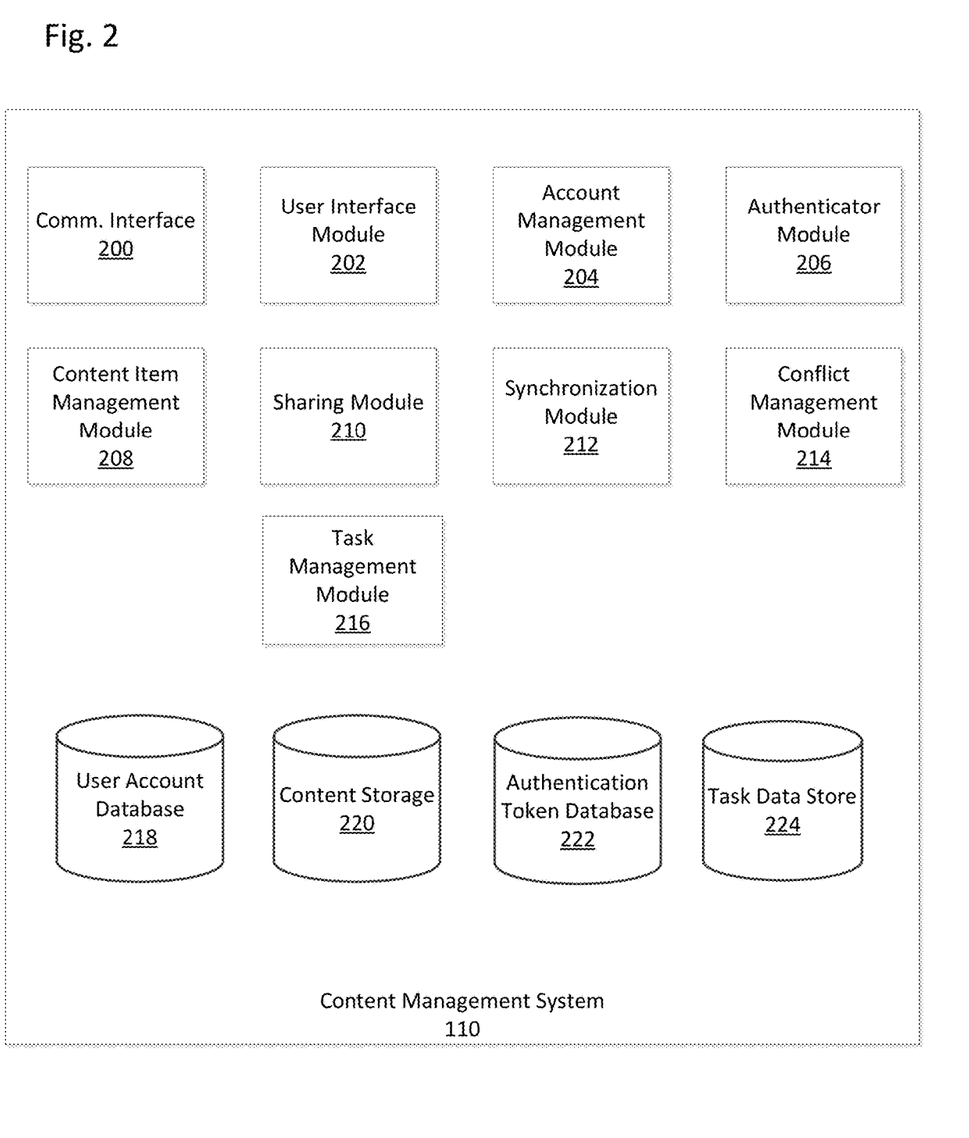
FIG. 2 shows components of a content management system, according to one embodiment.

FIG. 2 shows components of content management system 110 of FIG. 1, according to one embodiment. In one configuration, components described below with reference to content management system 110 are incorporated into devices 100 that share and synchronize content items without management by content management system 110. These devices 100 may synchronize content and share interaction information over network 120 or via a direct connection as described above. In this configuration, devices 100 may incorporate functionality of synchronization module 212, conflict management module 214, interaction synchronization module 216, and other modules and data stores for incorporating functionality described below as provided by content management system 110. Accordingly, devices 100 in this configuration operate in a peer-to-peer configuration and may do so without content management system 110 or network 120.

When using content management system 110 to facilitate the various content management services, a user can create an account with content management system 110. The account information can be maintained in user account database 218, and is one method for storing account information. User account database 218 can store profile information for registered users. In some cases, the only personal information in the user profile can be a username and/or email address. However, content management system 110 can also be configured to accept additional user information, such as password recovery information, demographics information, payment information, and other details. Each user is associated with an identifier, such as a userID or a user name.

User account database 218 can also include account management information, such as account type, e.g., free or paid; usage information for each user, e.g., file edit history; maximum storage space authorized; storage space used; content storage locations; security settings; personal configuration settings; content sharing data; etc. Account management module 204 can be configured to update and/or obtain user account details in user account database 218. Account management module 204 can be configured to interact with any number of other modules in content management system 110.

An account can be associated with multiple devices 100, and content items can be stored in association with an account. The stored content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photo folder that is intended for photo content items and that provides specific attributes and actions tailored for photos; an audio folder that provides the ability to play back audio file content items and perform other audio related actions; or other special purpose folders. An account can also include shared folders or group folders that are linked with and available to multiple user accounts. The permissions for multiple users may be different for a shared folder. In one embodiment, the account is a namespace that may be associated with several users, each of whom may be associated with permissions to interact with the namespace.

The content can be stored in content storage 220, which is one means for performing this function. Content storage 220 can be a storage device, multiple storage devices, or a server. Alternatively, content storage 220 can be a cloud storage provider or network storage accessible via one or more communications networks. In one configuration, content management system 110 stores the content items in the same organizational structure as they appear on the device. However, content management system 110 can store the content items in its own order, arrangement, or hierarchy.

Content storage 220 can also store metadata describing content items, content item types, and the relationship of content items to various accounts, folders, or groups. The metadata for a content item can be stored as part of the content item or can be stored separately. In one configuration, each content item stored in content storage 220 can be assigned a system-wide unique identifier.

Content storage 220 can decrease the amount of storage space required by identifying duplicate content items or duplicate segments of content items. In one embodiment, for example, a content item may be shared among different users by including identifiers of the users within ownership metadata of the content item (e.g., an ownership list), while storing only a single copy of the content item and using pointers or other mechanisms to link duplicates with the single copy. Similarly, content storage 220 stores content items using a version control mechanism that tracks changes to content items, different versions of content items (such as a diverging version tree), and a change history. The change history includes a set of changes that, when applied to the original content item version, produces the changed content item version.

Content management system 110 automatically synchronizes content items from one or more devices, using synchronization module 212, which is one means for performing this function. The synchronization is platform-agnostic. That is, the content items are synchronized across multiple devices 100 of varying type, capabilities, operating systems, etc. For example, client application 200 synchronizes, via synchronization module 212 at content management system 110, content in the file system of device 100 with the content items in an associated user account on system 110. Client application 200 synchronizes any changes to content items in a designated folder and its sub-folders with the synchronization module 212. Such changes include new, deleted, modified, copied, or moved files or folders. Synchronization module 212 also provides any changes to content associated with device 100 to client application 200. This synchronizes the local content at device 100 with the content items at content management system 110. Synchronization module 212 may also be used to synchronize changes made to a content item at the content management system by a user on device 100 using a web interface.

Conflict management module 214 determines whether there are any discrepancies between versions of a content item located at different devices 100. For example, when a content item is modified at one device and a second device, differing versions of the content item may exist at each device. Synchronization module 212 determines such versioning conflicts, for example by identifying the modification time of the content item modifications. Conflict management module 214 resolves the conflict between versions by any suitable means, such as by merging the versions, or by notifying the device of the later-submitted version.

A user can also view or manipulate content via a web interface generated by user interface module 202. For example, the user can navigate in a web browser to a web address provided by content management system 110. Changes or updates to content in content storage 220 made through the web interface, such as uploading a new version of a file, are synchronized back to other devices 100 associated with the user's account. Multiple devices 100 may be associated with a single account and files in the account are synchronized between each of the multiple devices 100. User interface module 202 may also provide web interfaces for adding tasks to a content item as well as providing a content item browser for viewing tasks and task status. These functions are further described below.

Content management system 110 includes communications interface 200 for interfacing with various devices 100, and with other content and/or service providers via an Application Programming Interface (API), which is one means for performing this function. Certain software applications access content storage 220 via an API on behalf of a user. For example, a software package, such as an app on a smartphone or tablet computing device, can programmatically make calls directly to content management system 110, when a user provides credentials, to read, write, create, delete, share, or otherwise manipulate content. Similarly, the API can allow users to access all or part of content storage 220 through a web site.

Content management system 110 can also include authenticator module 206, which verifies user credentials, security tokens, API calls, specific devices, etc., to determine whether access to requested content items is authorized, and is one means for performing this function. Authenticator module 206 can generate one-time use authentication tokens for a user account. Authenticator module 206 assigns an expiration period or date to each authentication token. In addition to sending the authentication tokens to requesting devices, authenticator module 206 can store generated authentication tokens in authentication token database 222. Upon receiving a request to validate an authentication token, authenticator module 206 checks authentication token database 222 for a matching authentication token assigned to the user. Once the authenticator module 206 identifies a matching authentication token, authenticator module 206 determines if the matching authentication token is still valid. For example, authenticator module 206 verifies that the authentication token has not expired or was not marked as used or invalid. After validating an authentication token, authenticator module 206 may invalidate the matching authentication token, such as a single-use token. For example, authenticator module 206 can mark the matching authentication token as used or invalid, or delete the matching authentication token from authentication token database 222.

Content management system 110 includes a sharing module 210 for sharing content publicly or privately. Sharing content publicly can include making the content item accessible from any computing device in network communication with content management system 110. Sharing content privately can include linking a content item in content storage 220 with two or more user accounts so that each user account has access to the content item. The content can also be shared across varying types of user accounts.

In some embodiments, content management system 110 includes a content management module 208 for maintaining a content directory that identifies the location of each content item in content storage 220, and allows client applications to request access to content items in the storage 220, and which is one means for performing this function. A content entry in the content directory can also include a content pointer that identifies the location of the content item in content storage 220. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts.

To share a content item privately, sharing module 210 adds a user account identifier to the content entry associated with the content item, thus granting the added user account access to the content item. Sharing module 210 can also be configured to remove user account identifiers from a content entry to restrict a user account's access to the content item.

To share content publicly, sharing module 210 generates a custom network address, such as a URL, which allows any web browser to access the content in content management system 110 without any authentication. The sharing module 210 includes content identification data in the generated URL, which can later be used by content management system 110 to properly identify and return the requested content item. For example, sharing module 210 can be configured to include the user account identifier and the content path in the generated URL. The content identification data included in the URL can be transmitted to content management system 110 by a device to access the content item. In addition to generating the URL, sharing module 210 can also be configured to record that a URL to the content item has been created. In some embodiments, the content entry associated with a content item can include a URL flag indicating whether a URL to the content item has been created.

Content management system 110 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1 G or more of main memory, as well as 500 Gb to 2 Tb of computer readable, persistent storage, and running an operating system such as LINUX or variants thereof. The operations of content management system 110 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein.

Similarly, conventional elements, such as firewalls, load balancers, failover servers, network management tools and so forth are not shown so as not to obscure the features of the system.

Task management module 216 operates with user interface module 202 to identify tasks entered by a user in a content item that a user is modifying. When the user designates a task, the user interface module 202 provides the task information to task management module 216. The task includes a description of the task, a status of the task (e.g., complete or incomplete), and metadata related to the task. The task is stored at task data store 224 and is associated with the content item in which the task is located. The metadata indicates various information about the task. The particular types of information stored by the metadata may vary in different embodiments, and each task may also have different types of metadata associated with the task. The metadata for a task may include a creating user identifier for a user creating the task (i.e., the user that entered the task for user interface module 202), an assigned user identifier for a user assigned to a task, one or more categories associated with the task, a deadline for completing the task, and other information relating to the task. Task management module 216 may also handle search queries received from devices 100. Task management module 216 identifies tasks in task data store 224 that match a search query and the content items that contain the tasks. The task management module 216 may store additional indices or other data structures to assist in performing searches, such as an index of categories, users, and so forth. Task creation and searching is further described below.

Figure 3:
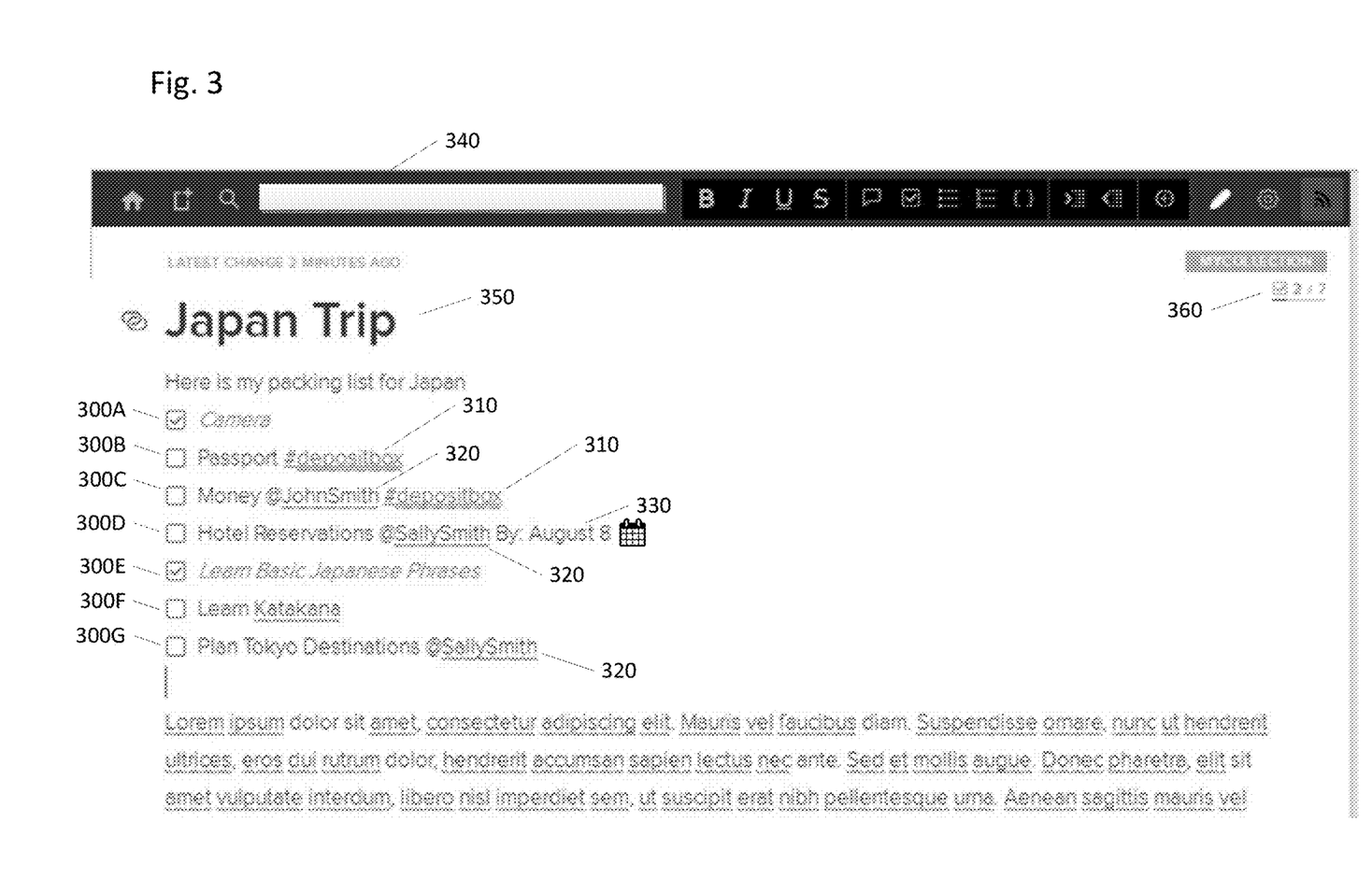
FIG. 3 shows an interface for interacting with a content item that permits a user to enter tasks for the content item.

FIG. 3 shows an interface for interacting with a content item that permits a user to enter tasks for the content item. This interface may be provided by the client 100 or by content management system 110 via a web interface, for example as provided by user interface module 202. The interface as shown illustrates a content item (e.g., a document) that may be edited by the user, though any content item may be used consistent with the task entry and management described herein. The interface shown in FIG. 3 may permit multiple users to modify a content item simultaneously. Modifications made to the content item by one user are synchronized to another user's display. In addition, an indication may also be provided of another user's presence or particular portions of the content items modified by particular users. The document includes a title 350, a search input 340, and a set of tasks 300A-G (generally or collectively 300). In this example, a user may type within the interface to add information to the document. As described below, search input 340 may be used to search for content items and tasks relevant to a search query.

The tasks 300 may be designated by a user based on a selection of a task icon, or may be identified by a particular character string that indicates a task. In one example, a character string of closed brackets "[ ]" at the beginning of a line designates the line as a task (not shown). FIG. 3 shows tasks 300 created after this character string has been entered to designate a task. When the interface receives this particular character string, the entry is interpreted as a task and an interactive box indicating the task 300 is created. The task is associated with a completion status. Typically, the interactive box may be selected, clicked on, or touched (via a touch screen) to toggle the completion status of the task. When the task is marked complete by a user (i.e., the user clicks the interactive box), the completion status is changed from "incomplete" to "complete" and the box is checked to indicate the completion status has been changed. The user may interact with the box to toggle the completion status back to "complete," if desired.

The task is typically also associated with a description of the task to be completed. For example, task 300A is associated with a description of "Camera" and task 300B is associated with a description of "Passport." The user may also enter additional metadata associated with the task. Some metadata for the task may be automatically determined, for example to identify the user that entered the task as the task creator. Example metadata shown in FIG. 3 includes a category 310, designated by a preceding hash character (#). In this example, the same category 310, "depositbox," is applied to two tasks, 300B and 300C, though different categories may be applied to different tasks. Categories 310 may also be thought of as tags or identifiers for the tasks. These categories 310 are stored as metadata associated with the tasks 300. Though only one category 310 is shown with respect to particular tasks in FIG. 3, any number of categories 310 may be applied to a task.

In addition to categories, further metadata may be associated with the tasks. Users may be designated in the tasks as an assigned user 320. The assigned users 320 in this example include JohnSmith for task 300C and SallySmith for tasks 300D and 300G. The assigned users in this example are designated by a preceding at symbol (@). In addition, a deadline 330 is designated by a "By:" character string in this example. These various types of metadata are provided to task management module 216 by user interface module 202 and associated with the tasks 300 in the task data store 224.

Because the system can recognize particular input strings as relating to particular types of data about the task, users may quickly generate and enter task information and related metadata. For example, a user entering "[ ] Buy cereal # grocery By: May 15" generates a task with a description "buy cereal" associated with a category "grocery" and with a deadline of May 15. As described below, the metadata associated with a task may be used by a user to quickly identify tasks that can be grouped by metadata, for example by identifying all tasks with a particular category or the tasks assigned to a particular user.

As tasks are added and updated in the content item, completion status summary 360 is displayed and updated to reflect the changing status of the tasks. Completion status summary 360 indicates the number of tasks relevant to the displayed content item (and in some implementations, to the tasks responsive to a search query) and the number of those tasks that have a status of "complete." In this example, a total of seven tasks 300A-G are associated with the displayed content item, of which two are indicated as complete. Thus, completion status summary 360 indicates that two of seven tasks are complete.

In one embodiment, when a user interacts with (e.g., clicks on) a metadata item, such as a category, the device 100 determines a search query and executes a search based on that metadata item. An example of such a search is provided below in FIG. 6.

Figure 4:
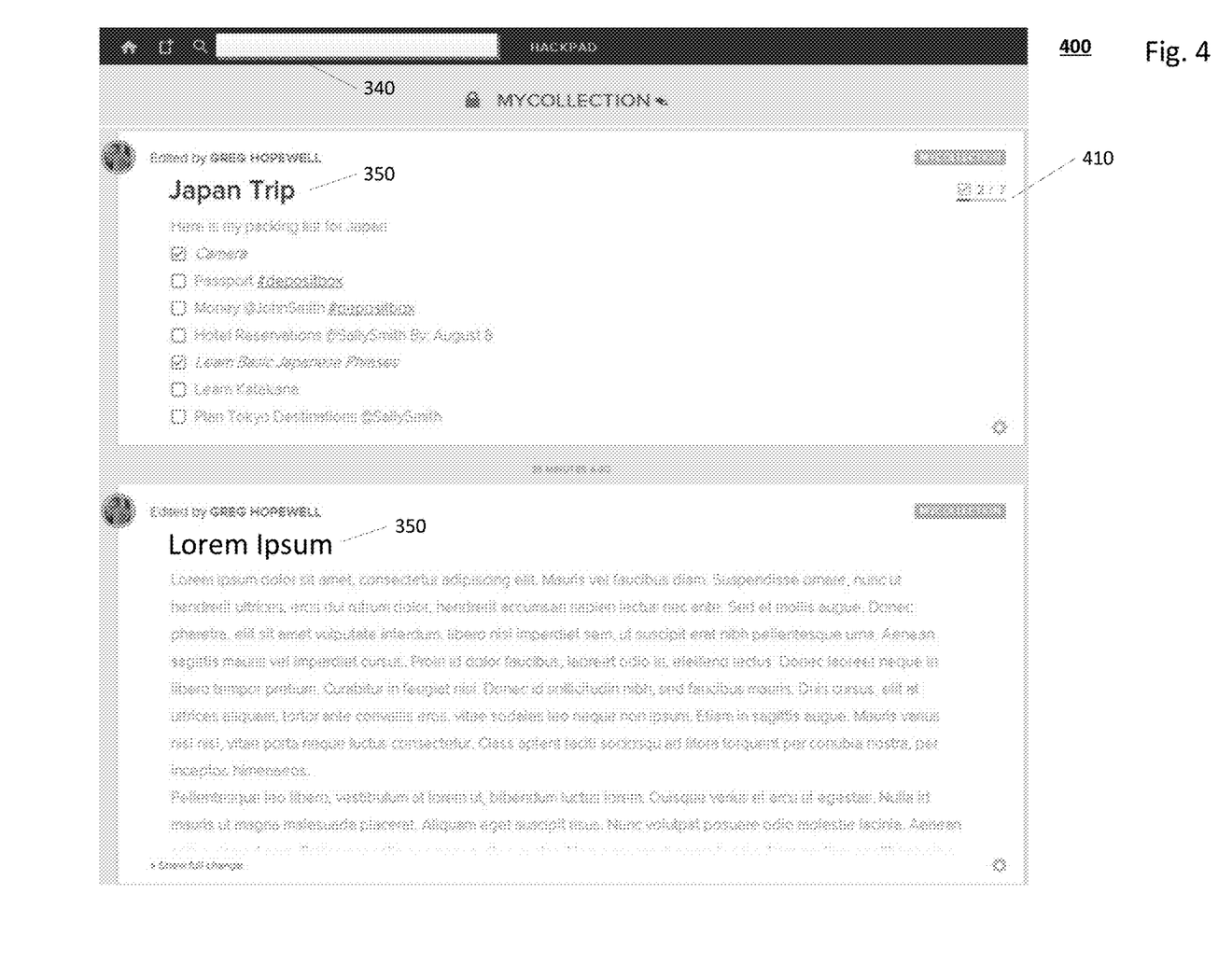
FIG. 4 shows a content item browser that displays multiple content items and a task completion summary associated with a content item.

FIG. 4 shows a content item browser 400 that displays multiple content items and a task completion summary 360 associated with a content item. In this example, the content item browser is used to view a preview of a plurality of content items, in this case with titles 350 "Japan Trip" and "Lorem Ipsum." The first content item in this example, titled 350 "Japan Trip" is associated with a set of tasks, some of which are displayed in the preview of the content item shown with the content item browser. In addition, the content items are displayed with a completion status summary 410 associated with that content item. In FIG. 4, the first content item is associated with seven tasks, two of which are associated with a "complete" completion status, which is reflected in the completion status summary 410. The second content item is not associated with any tasks, and no completion status summary is displayed with the second content item.

Figure 5:
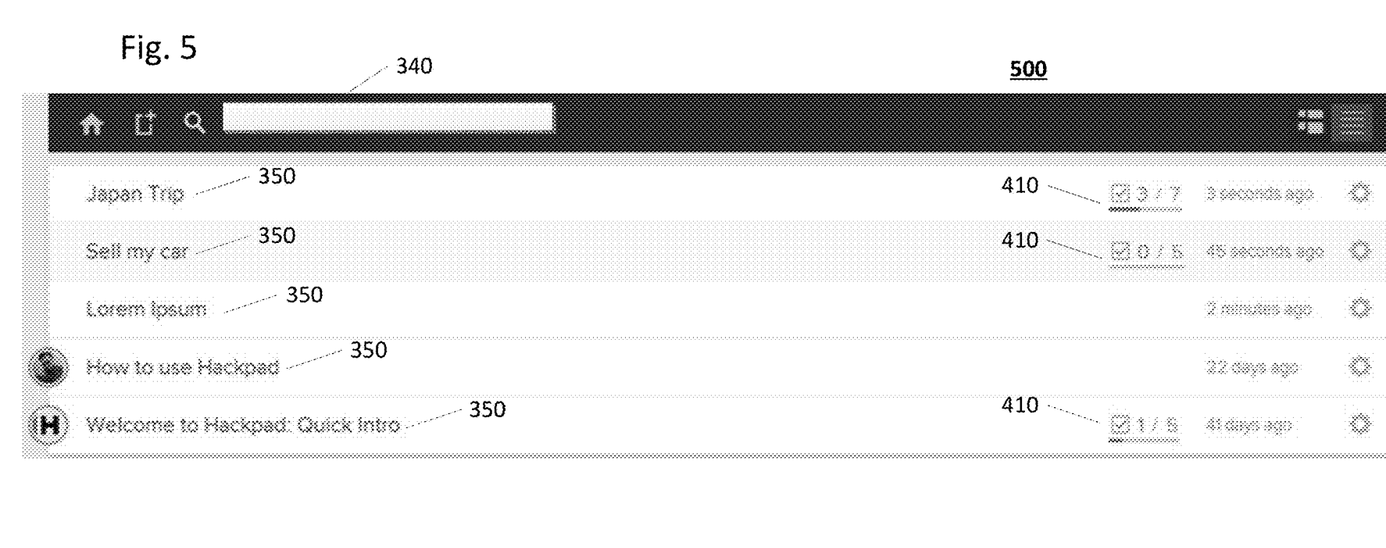
FIG. 5 shows an alternate display of a content item browser 500 according to one embodiment.

FIG. 5 shows an alternate display of a content item browser 500 according to one embodiment. In content item browser 500, a preview of content items is not displayed. However, each content item is displayed with an associated completion status summary 410.

Figure 6:
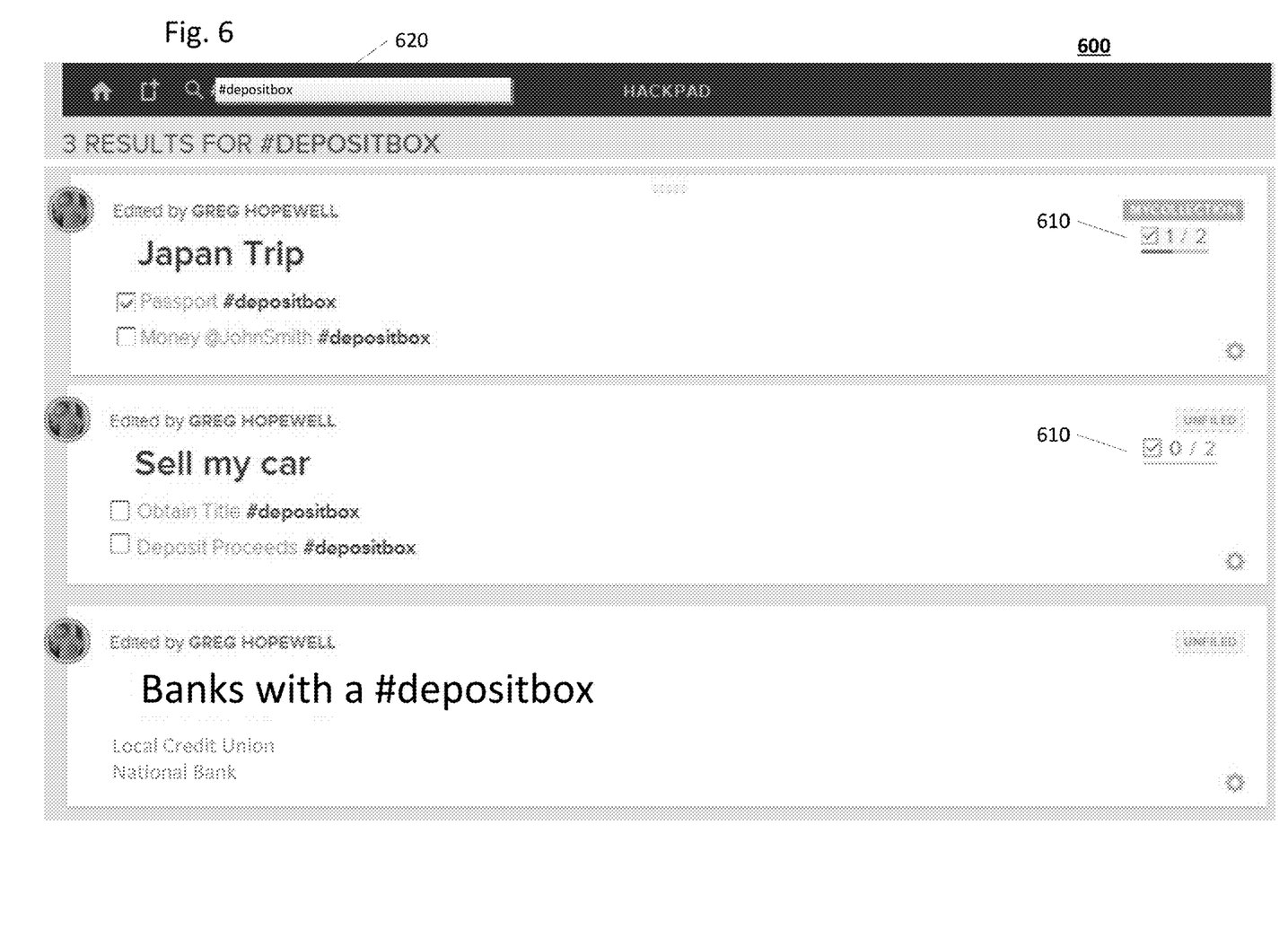
FIG. 6 shows a search results interface for a search performed on a metadata item.

FIG. 6 shows a search results interface 600 for a search performed on a metadata item. The search results interface 600 is a content item browser that shows several content items relevant to the search query. In this example, the metadata item is the category "depositbox" as indicated in search input 620. The query is received by device 100 and provided to user interface module 202. The user interface module 202 executes a search against content storage 220 to identify content items associated with the search query. In addition, the search query is provided to task management module 216 to identify tasks that match the search query. Thus, the search results identified by content management system 110 may include content items matching the search query as well as tasks that match the search query. Accordingly, though the content item "Japan Trip" may include a several additional tasks, the completion status summary 610 identified in the search results interface 600 provides a summary of the two tasks that were provided as search results with the searched category. In this example, the description of the identified tasks is also displayed to permit a user to quickly review the tasks relevant to the search query. That is, though the content item may begin with other content, the tasks relevant to the query are identified and presented, rather than the initial portion of the content item.

In addition, certain content items may be identified based on the category, that do not have identified tasks relevant to that category, such as the content item titled "Banks with a # depositbox" listed as the third content item in this example. This example content item is not listed with a completion status summary as it does not include any tasks associated with the labeled category.

Though search results are shown in this example as results for metadata relating to a category, a search may be performed for any type of metadata associated with a task and displayed in search results interface 600. Thus, users may perform searches to identify tasks that they have created in a content item, or tasks assigned to that user. In addition, the deadline metadata for tasks may be used by the content management system 110 to generate entries in a calendar or a list of deadline-ordered results, for example to provide a calendar or docket of tasks.

Figure 7:
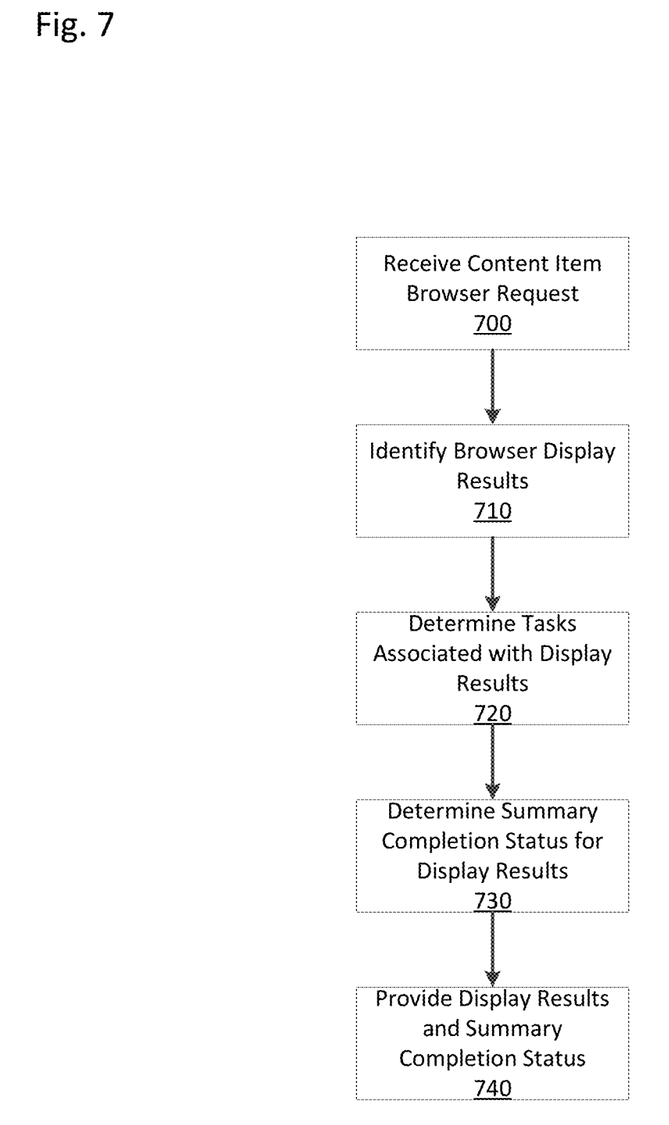
FIG. 7 shows an example method for preforming a search of content items to identify tasks relevant to a search query.

FIG. 7 shows an example method for preforming a search of content items to identify tasks relevant to a search query for presentation in a search results interface, such as the interface shown in FIG. 6. This method may be used to identify tasks and a task summary for a content item browser, and may also be used to generate a content item browser responsive to a search query.

Initially, a browser request is received 700. The browser request may be generated by user device 100 when a user browses to a particular organization of content items, or may be generated when a user enters a search query for a particular term or metadata. Thus, the browser request may or may not designate a search query.

Next, a set of browser display results are identified 710 based on the received browser request. When the browser request does not include a search query, the identified display results include the content items associated with the organization in which the user is browsing. When the browser request includes a search query, the content items are searched at content storage 220 to identify content items matching the search query. Next, tasks associated with the browser display results are identified 720. Tasks are also searched at task data store 224 to identify tasks that match the search query, if present, and otherwise the tasks associated with identified content items are identified. Using the identified tasks, any additional content items that are associated with the identified tasks are added to the browser display results.

Using the identified content items and tasks, a summary completion status is determined 730 for each content item. When relevant tasks to a search query were identified, the tasks summarized by the summary completion status may be filtered to summarize only those tasks that match the search query. That is, if a search query was provided and five out of fifteen tasks match metadata designated by the search query, only those five tasks are provided in the summary completion status. After identifying the related content items and summary completion status, the relevant content items and summary completion status for each item is provided 740 to the user device 100 for display to the user. As shown in FIG. 6, this permits a user to quickly determine the number of tasks for a content item that are related to the search query.

Tasks and information relating to the tasks may be communicated to users in a variety of ways. In addition to the searches shown in FIGS. 6 & 7, users may also view a "home" page associated with the content item. The home page may summarize the tasks associated with the user viewing the home page. For example, the home page may consolidate tasks created by the user or assigned to the user. In addition, when a task is assigned to a user, a notification may be generated to notify a user that the task has been assigned. These notifications may be sent to the assigned user by any method, such as by displaying the tasks on the home screen of the assigned user or transmitting a message to a client device 100 associated with the assigned user.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   maintaining a data store of a content management system, the data store including a plurality of content items synchronized across a plurality of user devices including at least one content item created at a first user device of the plurality of user devices and at least one content item created at a second user device of the plurality of user devices, the plurality of content items each containing a plurality of tasks associated with a completion status;
   generating, by one or more processors of the content management system, for display on the first user device of the plurality user devices, a user interface comprising a search field and a first set of the plurality of content items, each content item of the first set displayed in a respective section of the user interface, the respective section comprising:
      the plurality of tasks of the content item, and
      a task status indicator for the content item, the task status indicator indicating a number of completed tasks in the plurality of tasks within the content item relative to a total number of tasks in the plurality of tasks within the content item,
   receiving, from a user of the first user device, a search term via the search field of the user interface displayed on the first user device;
   in response to receiving the search term, identifying, by the one or more processors, a subset of the first set of content items corresponding to content items of the first set of content items that contain at least one task containing the search term;
   automatically updating, by the one or more processors, the user interface for display on the first user device, by modifying the respective sections to display content items of the identified subset of the first set of content items, and wherein the sections for each of the subset of the first set of content items are each updated to display:
- a subset of the plurality of tasks of the content item, corresponding to tasks of the content item containing the search term, and not including any tasks of the content item that do not contain the search term, and
- an updated task status indicator for the content item indicating a number of completed tasks in the plurality of tasks of the content item containing the search term, relative to a total number of tasks in the plurality of tasks of the content item containing the search term, wherein the updated task status indicator for a first content item of the subset does not account for a completion status of an additional task of the first content item that does not contain the search term.

2. The method of claim 1, further comprising:
providing a user interface for editing a content item;
receiving, from a user input provided to the user interface, at least one task designated by an input received from a user;
associating the at least one task with the content item and associating a completion status with each of the at least one tasks.

3. The method of claim 2, wherein the user input designates a task using the specific character string.

4. The method of claim 3, wherein the character string is "[ ]".

5. The method of claim 2, wherein the user input further designates metadata associated with the task, the metadata distinguished by a designated character string and identifying a type of metadata.

6. The method of claim 1, wherein the plurality of tasks of each content item are associated with task metadata, and the user interface is updated to provide the subset of the first set of content items containing at least one task containing the search term, wherein the task metadata of the at least one task matches the search term.

7. The method of claim 6, wherein the task metadata describes a category associated with the respective task, and the search term specifies the category associated with a task.

8. The method of claim 6, wherein the task metadata of the at least one task indicates an assigned user for the task.

9. The method of claim 6, wherein the task metadata of the at least one task indicates a user that created the task.

10. The method of claim 1, further comprising synchronizing the plurality of content items across a plurality of user devices.

11. The method of claim 1, wherein each of the plurality of content items may be modified by a plurality of users, the first content item comprising at least one indication of a portion of the first content item modified by a first user of the plurality of users.

12. The method of claim 1, further comprising displaying adjacent to each of the plurality of content items at least one task of the plurality of tasks associated with the content item.

13. The method of claim 1, wherein the task status indicator for a content item of the plurality of content items displays at least a first number indicating a number of completed tasks associated with the content item and a second number indicating a total number of tasks associated with the content item.

14. A system comprising:
one or more processors;
a data store configured to store and maintain a plurality of content items synchronized across a plurality of user devices including at least one content item created at a first user device of the plurality of user devices and at least one content item created at a second user device of the plurality of user devices, the plurality of content items each containing a plurality of tasks associated with a completion status;
a memory storing instructions which, when executed by the one or more processors, cause the system to perform the steps of:
generating by the one or more processors, for display on the first user device of the plurality user devices, a user interface comprising a search field and a first set of the plurality of content items, each content item of the first set displayed in a respective section of the user interface, the respective section comprising:
the plurality of tasks of the content item, and
a task status indicator for the content item, the task status indicator indicating a number of completed tasks in the plurality of tasks within the content item relative to a total number of tasks in the plurality of tasks within the content item:
receiving, from a user of the first user device, a search term via the search field of the user interface displayed on the first user device;
in response to receiving the search term, identifying, by the one or more processors, a subset of the first set of content items corresponding to content items of the first set of content items that contain at least one task containing the search term;
automatically updating, by the one or more processors, the user interface for display on the first user device, by modifying the respective sections to display content items of the identified subset of the first set of content items, and wherein the sections for each of the subset of the first set of content items are each updated to display:
a subset of the plurality of tasks of the content item, corresponding to tasks of the content item containing the search term, and not including any tasks of the content item that do not contain the search term, and
an updated task status indicator for the content item indicating a number of completed tasks in the plurality of tasks of the content item containing the search term, relative to a total number of tasks in the plurality of tasks of the content item containing the search term, wherein the updated task status indicator for a first content item of the subset does not account for a completion status of an additional task of the first content item that does not contain the search term.

15. The system of claim 14, wherein the instructions further cause the system to:
provide a user interface for editing a content item;
receive, from a user input provided to the user interface, at least one task designated by an input received from a user;
associate the at least one task with the content item and associating a completion status with each of the at least one tasks.

16. The system of claim 15, wherein the user input designates a task using the specific character string.

17. The system of claim 14, wherein the plurality of tasks of each content item are associated with task metadata, and the user interface is updated to provide the subset of the first set of content items containing at least one task containing the search term, wherein the task metadata of the at least one task matches the search term.

18. The system of claim 17, wherein the task metadata describes a category associated with the respective task, and the search term specifies the category associated with a task.

19. A non-transitory computer-readable storage medium storing instructions that, when executed by a computing system, cause the computing system to perform operations comprising:
  maintaining a data store of a content management system, the data store including a plurality of content items synchronized across a plurality of user devices including at least one content item created at a first user device of the plurality of user devices and at least one content item created at a second user device of the plurality of user devices, the plurality of content items each containing a plurality of tasks associated with a completion status;
  generating, by one or more processors, for display on the first user device of the plurality user devices, a user interface comprising a search field and a first set of the plurality of content items, each content item of the first set displayed in a respective section of the user interface, the respective section comprising:
    the plurality of tasks of the content item, and
    a task status indicator for the content item, the task status indicator indicating a number of completed tasks in the plurality of tasks within the content item relative to a total number of tasks in the plurality of tasks within the content item:
  receiving, from a user of the first user device, a search term via the search field of the user interface displayed on the first user device;
  in response to receiving the search term, identifying, by the one or more processors, a subset of the first set of content items corresponding to content items of the first set of content items that contain at least one task containing the search term;
  automatically updating, by the one or more processors, the user interface for display on the first user device, by modifying the respective sections to display content items of the identified subset of the first set of content items, and wherein the sections for each of the subset of the first set of content items are each updated to display:
    a subset of the plurality of tasks of the content item, corresponding to tasks of the content item containing the search term, and not including any tasks of the content item that do not contain the search term, and
    an updated task status indicator for the content item indicating a number of completed tasks in the plurality of tasks of the content item containing the search term, relative to a total number of tasks in the plurality of tasks of the content item containing the search term, wherein the updated task status indicator for a first content item of the subset does not account for a completion status of an additional task of the first content item that does not contain the search term.

20. The non-transitory computer-readable storage medium of claim 19, the operations further comprising:
  providing a user interface for editing a content item;
  receiving, from a user input provided to the user interface, at least one task designated by an input received from a user;
  associating the at least one task with the content item and associating a completion status with each of the at least one tasks.

21. The non-transitory computer-readable storage medium of claim 20, wherein the user input further designates metadata associated with the task, the metadata distinguished by a designated character string and identifying a type of metadata.

22. The non-transitory computer-readable storage medium of claim 19, wherein the plurality of tasks of each content item are associated with task metadata, and the user interface is updated to provide the subset of the first set of content items containing at least one task containing the search term, wherein the task metadata of the at least one task matches the search term.

23. The non-transitory computer-readable storage medium of claim 22, wherein the task metadata describes a category associated with the respective task, and the search term specifies the category associated with a task.

* * * * *